United States Patent
Seki

(10) Patent No.: US 7,715,492 B2
(45) Date of Patent: May 11, 2010

(54) TRANSMITTER AND TRANSMISSION METHOD

(75) Inventor: Hiroyuki Seki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 775 days.

(21) Appl. No.: 11/589,951

(22) Filed: Oct. 31, 2006

(65) Prior Publication Data
US 2007/0280365 A1 Dec. 6, 2007

(30) Foreign Application Priority Data
Jun. 6, 2006 (JP) ............................. 2006-157610

(51) Int. Cl.
*H04L 27/00* (2006.01)
(52) U.S. Cl. ...................... 375/295; 375/260
(58) Field of Classification Search .................. 375/260, 375/295; 370/203–210, 335
See application file for complete search history.

(56) References Cited

U.S. PATENT DOCUMENTS

| 2005/0002324 | A1* | 1/2005 | Sutivong et al. | 370/208 |
|---|---|---|---|---|
| 2007/0004465 | A1* | 1/2007 | Papasakellariou et al. | 455/571 |
| 2007/0183520 | A1* | 8/2007 | Kim et al. | 375/260 |
| 2008/0095252 | A1 | 4/2008 | Kim et al. | |

FOREIGN PATENT DOCUMENTS

WO 2007/145492 12/2007

OTHER PUBLICATIONS

Korean Office Action, Notification of Opinion Submission, Application No. 10-2006-113969, dated Nov. 1, 2007 (with an English translation); p. 4.
3GPP, R1-050584, Motorola, "EUTRA Uplink Numerology and Design," Jun. 20-21, 2005.
3GPP, R1-050702, NTT DoCoMo, et al., "DFT-Spread OFDM with Pulse Shaping Filter in Frequency Domain in Evolved UTRA Uplink," Aug. 29-Sep. 9, 2005.
3GPP, R1-060993, NTT DoCoMo, et al., "Investigations on Adaptive Control of Roll-Off Factor for DFT-Spread OFDM Based SC-FDMA in Uplink," Mar. 27-31, 2006.
European Search Report and Annex to the European Search Report on European Patent Application No. EP06123300.3-1525/1868336. Dated Sep. 22, 2008.

* cited by examiner

*Primary Examiner*—Emmanuel Bayard
(74) *Attorney, Agent, or Firm*—Myers Wolin, LLC

(57) ABSTRACT

A transmitter includes a time/frequency-domain converter that converts a time-domain data signal to a frequency-domain data signal of a fixed number; a subcarrier allocator that allocates the obtained frequency-domain data signal to any of subcarriers, the number of which exceeds the fixed number, the subcarriers being allocated in a predetermined transmission frequency band; and a controller that controls the subcarrier allocator to allocate signals other than the data signal to subcarriers in an idle band to which the data signal is not allocated. By this, without the need for a plurality of time/frequency-domain conversion circuits with a large size, such as DFTs, frequency utilization efficiency (data transmission efficiency) is improved.

16 Claims, 11 Drawing Sheets

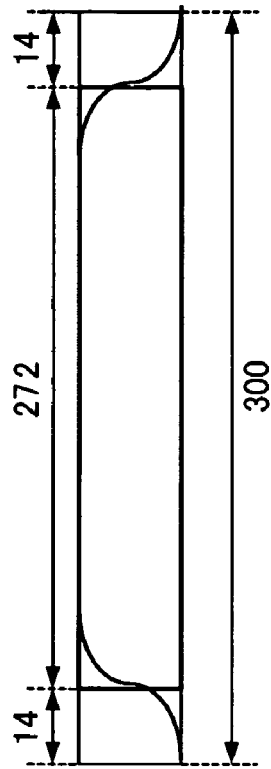
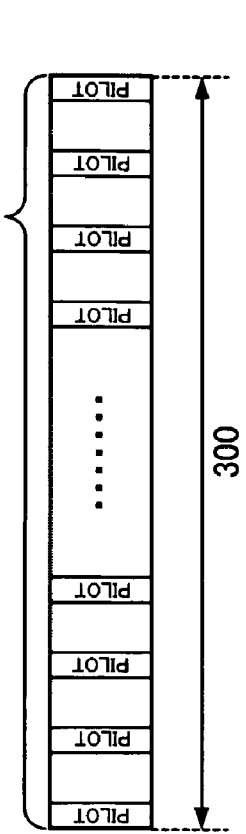
FIG. 2A  FOR 16QAM MODULATION, ROLL-OFF RATE IS 0.1
FIG. 2B  FOR QPSK MODULATION, ROLL-OFF RATE IS 0

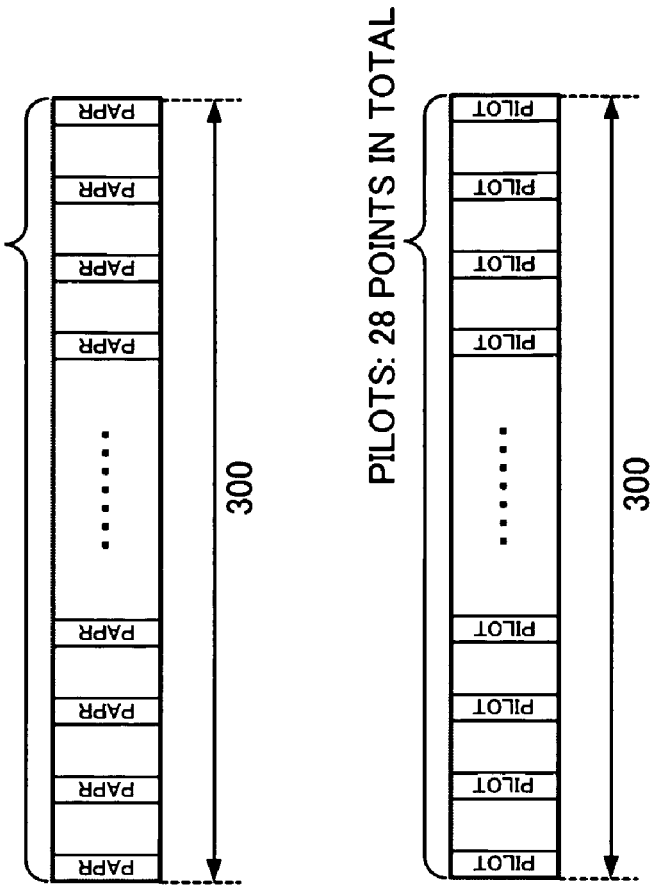

FOR 16QAM MODULATION,
PILOT : PAPR REDUCTION PATTERN
= 1 : 2

FOR QPSK MODULATION,
PILOT : PAPR REDUCTION PATTERN
= 2 : 1

TRANSMITTER AND TRANSMISSION METHOD

CROSS REFERENCE TO RELATED APPLICATIONS

This application is based on and hereby claims priority to Japanese Application No. 2006-157610 filed on Jun. 6, 2006 in Japan, the contents of which are hereby incorporated by reference.

BACKGROUND OF THE INVENTION (1) Field of the Invention

The present invention relates to a transmitter and a transmission method. The present invention relates to a technique suitable for use in radio communication techniques such as mobile communication systems that use a DFT-S-OFDM (Discrete Fourier Transform-Spread-Orthogonal Frequency Division Multiplexing) scheme, for example.

(2) Description of Related Art

At present, in 3GPP (3rd Generation Partnership Project), standardization of enhancement (Long Term Evolution) of third generation mobile communication systems is under consideration. For an uplink access scheme, adoption of SC-FDMA (Single Carrier-Frequency Division Multiple Access) is considered and a method of implementing the SC-FDMA using the DFT-S-OFDM is one of the promising approaches.

FIG. 8 shows a configuration that focuses attention on an essential part of a transmitter that adopts the DFT-S-OFDM. The transmitter shown in FIG. 8 includes, for example, a modulator 101, a DFT (Discrete Fourier Transformer) 102, a subcarrier mapper 103, an IFFT (Inverse Fast Fourier Transformer) 104, and a CP (Cyclic Prefix) inserter 105. The following describes, as an example, parameters for the case in which the transmission frequency band is 5 MHz.

In the transmitter having the above-described configuration, a transmission data signal is modulated by the modulator 101 by a required modulation scheme such as QPSK or 16 QAM. The modulated data signal has a symbol rate of 4.5 MHz.

The modulated data signal is subjected to a DFT processing for every 300 symbols (which is called a block) in the $N_{DFT}$ (e.g., 300)-point DFT 102, whereby the signal is converted from a time-domain signal to a frequency-domain signal. That is, the DFT-processed modulated data signal is converted to a signal composed of $N_{DFT}$ (=300) subcarriers.

The subcarrier mapper 103 maps the 300-subcarrier signal onto an $N_{IFFT}$ (e.g., 512)-point IFFT (IFFT 104), thereby performing a frequency-domain arrangement. Depending on the subcarrier mapping method, the transmission bandwidth is extended in form and thus this subcarrier mapping is called a spread.

The subcarrier-mapped signal is subjected to an IFFT processing in the IFFT 104, whereby the signal is converted from the frequency-domain signal to a time-domain signal again. An example of FIG. 8 shows an operation in which an output from the 300-point DFT 102 is continuously arranged on the 512-point IFFT and a zero signal is inserted in the remaining 212 points.

By this, the signal of 300 points per block prior to the DFT is converted to a signal of 512 points per block after the IFFT. That is, the signal of 4.5 MHz prior to the DFT is over sampled to 7.68 MHz after the IFFT.

To every block of the IFFT-processed signal, a CP (Cyclic Prefix) is added by the CP inserter 105. Gathering, for example, seven CP-added blocks composes one frame. An example of the frame is shown in FIG. 9. In this case, two blocks (see hatched portions) in one frame are allocated as pilot bocks for pilot symbols. Note that the pilot symbols (hereinafter also simply refereed to as "pilots") are signals known by a receiving end and are used for channel estimation for demodulation of a data channel, for example.

Meanwhile, reasons that the DFT-S-OFDM scheme is considered in the 3GPP include an improvement in frequency utilization efficiency. In third generation mobile communication schemes (hereinafter also referred to as the "3G schemes") such as W-CDMA, for a band limitation method, time-domain FIR (Finite Impulse Response) filter is used. With this method, it is difficult to perform steep band limitation and thus there is a need to perform band limitation by an FIR filter with a high roll-off rate. For example, in the 3G schemes, the symbol rate of a signal to be transmitted in a bandwidth of 5 MHz is limited to 3.84 MHz.

On the other hand, in the DFT-S-OFDM, as described above, a DFT-processed frequency-domain signal is converted to a time-domain signal using an IFFT which is larger in size than the DFT, whereby over sampling and band limitation are performed at the same time. In the configuration in FIG. 8, waveform shaping is not performed and thus it is equivalent to performing band limitation using a window function (rectangular filter) with the roll-off rate α being 0; however, as shown in FIG. 10, for example, it is also possible to perform gradual band limitation using a waveform shaping filter 106 with the roll-off rate being α>0. In an example of FIG. 10, in the case where it is assumed that the transmission bandwidth is 5 MHz, the symbol rate is lowered to 4.08 MHz and the DFT size is reduced to 272. As such, by allowing a signal which is DFT-processed by the DFT 102 to pass through the waveform shaping filter 106, gradual band limitation is performed.

An operation of a waveform shaping processing by the waveform shaping filter 106 is shown in FIG. 11. In FIG. 11, part of a DFT-processed 272-subcarrier signal (14 subcarriers at each end) is cyclically copied, whereby a signal of 300 subcarriers in total is generated. Then, by multiplying the signal by a coefficient of a raised cosine function with the roll-off rate α being 0.1, waveform shaping is performed.

As such, in the DFT-S-OFDM, merely by performing multiplication by a coefficient in a frequency-domain, waveform shaping can be performed and thus the roll-off rate α can be relatively easily changed (controlled).

Advantages of performing gradual band limitation by increasing the roll-off rate α include an effect of reduction of a PAPR (Peak to Average Power Ratio). For example, as shown in FIGS. 10 and 11, in the case where band limitation with the roll-off rate α being 0.1 is performed, the PAPR is reduced by the order of 0.5 dB as compared with the case where band limitation is performed by a rectangular filter with the roll-off rate α being 0, as shown in FIG. 8. In an uplink where transmission is performed from a terminal, by reducing the PAPR, the maximum transmission power can be increased and thus advantages such as an increase in radio wave reaching distance and an improvement in amplifier efficiency can be obtained. As such, the frequency utilization efficiency and the PAPR have a trade-off relationship.

In the DFT-S-OFDM, a DFT computation processing is required and thus generally there is a problem of an increase in circuit size. If an FFT whose number of points is a power of two can be used for a DFT, a significant reduction in circuit size is achieved; however, in practice, since parameters are designed to obtain optimum frequency utilization efficiency and PAPR characteristics, the DFT size is not always a power of two. Thus, in the DFT-S-OFDM scheme, there is a tendency that the circuit size increases.

The following Non-Patent Documents 1, 2, and 3 relate to the DFT-S-OFDM scheme which is under consideration in the 3GPP. The Non-Patent Document 1 is a document prepared at an early stage when the DFT-S-OFDM system is proposed in the 3GPP and describes basic matters regarding the DFT-S-OFDM technique. The Non-Patent Document 2 introduces a band limitation method and results of consideration of PAPR characteristics in the DFT-S-OFDM scheme. The Non-Patent Document 3 proposes adaptive control of the roll-off rate and the size of a DFT.

[Non-Patent Document 1] 3GPP, R1-050584, Motorola, "EUTRA Uplink Numerology and Design", Jun. 20-21, 2005

[Non-Patent Document 2] 3GPP, R1-050702, NTT DoCoMo, et al., "DFT-Spread OFDM with Pulse Shaping Filter in Frequency Domain in Evolved UTRA Uplink", Aug. 29-Sep. 2, 2005

[Non-Patent Document 3] 3GPP, R1-060993, NTT DoCoMo, et al., "Investigation on Adaptive Control of Roll-off Factor for DFT-Spread OFDM Based SC-FDMA in Uplink", Mar. 27-31, 2006

As described above, in the DFT-S-OFDM scheme, the PAPR and the frequency utilization efficiency have a trade-off relationship. The PAPR characteristics are known to greatly depend also on a modulation scheme. For example, in 16 QAM, the PAPR is higher than QPSK by the order of 1.0 dB.

Hence, in the case where the modulation scheme for transmission data frequently changes depending on adaptive modulation, the PAPR significantly changes and thus there is a need to perform control to suppress the PAPR to a level lower than a certain level. For example, a method may be considered in which for 16 QAM-modulated data, the PAPR is actively reduced, and for QPSK-modulated data, the frequency utilization efficiency is actively improved rather than reducing the PAPR, whereby the transmission efficiency of the entire system is improved.

Specifically, as proposed also by the Non-Patent Document 3, in the case where the modulation scheme is 16 QAM, to actively reduce the PAPR, the roll-off rate α is increased and the DFT size is reduced (e.g., as shown in FIGS. 10 and 11, the roll-off rate is set to 0.1 and the DFT size is set to 272). On the other hand, in the case where the modulation scheme is QPSK, there is no need to further reduce the PAPR and thus the roll-off rate α is reduced and the DFT size is increased (e.g., as shown in FIG. 8, the roll-off rate α is set to 0 and the DFT size is set to 300).

As such, in the DFT-S-OFDM scheme, by changing the roll-off rate α and the DFT size according to the modulation scheme, data transmission efficiency can be improved.

However, as described above, there is a problem that the circuit size of a DFT is large as compared with that of an FFT. Thus, in the case where the DFT size is changed according to the modulation scheme, a plurality of types of DFT circuits with a large size need to be provided on hardware, further increasing the impact of circuit size.

SUMMARY OF THE INVENTION

The present invention is made in view of the foregoing and other problems. An object of the present invention is therefore to provide a transmitter and a transmission method that allow for improvement in frequency utilization efficiency (data transmission efficiency) without the need for a plurality of time/frequency-domain conversion circuits with a large size such as DFTs.

In order to attain the above-described object, the present invention uses the following transmitter and transmission method. Specifically, (1) A transmitter of the present invention comprises: time/frequency-domain conversion means for converting a time-domain data signal to a frequency-domain data signal of a fixed number; subcarrier allocation means for allocating the frequency-domain data signal obtained by the time/frequency-domain conversion means to any of subcarriers, a number of which exceeds the fixed number, the subcarriers being allocated in a predetermined transmission frequency band; and control means for controlling the subcarrier allocation means to allocate signals other than the data signal to subcarriers in an idle band to which the data signal is not allocated by the subcarrier allocation means.

(2) In the transmitter, it is preferable that the control means control the allocation to the subcarriers in the idle band which is performed by the subcarrier allocation means, such that the signals other than the data signal are uniformly arranged in the transmission frequency band.

(3) The transmitter may further comprise PAPR reduction signal generation means for generating, as the signals other than the data signal, PAPR reduction signals for reducing a PAPR (Peak to Average Power Ratio) of the data signal, wherein the control means may control the subcarrier allocation means to allocate the PAPR reduction signals generated by the PAPR reduction signal generation means, to the subcarriers in the idle band.

(4) The transmitter may further comprise pilot generation means for generating pilot signals as the signals other than the data signal, wherein the control means may control the subcarrier allocation means to allocate the pilot signals generated by the pilot generation means, to the subcarriers in the idle band.

(5) It is preferable that the control means control the subcarrier allocation means to allocate the PAPR reduction signals to the subcarriers in the idle band upon the PAPR of the data signal being tend to increase.

(6) It is preferable that the control means control the subcarrier allocation means to allocate the pilot signals to the subcarriers in the idle band upon the PAPR of the data signal being tend to decrease.

(7) The transmitter may further comprise: PAPR reduction signal generation means for generating, as the signals other than the data signal, PAPR reduction signals for reducing a PAPR of the data signal; and pilot generation means for generating pilot signals as the signals other than the data signal, wherein the control means may control the subcarrier allocation means to allocate the PAPR reduction signals to the subcarriers in the idle band upon the PAPR of the data signal being tend to increase, and may control the subcarrier allocation means to allocate the pilot signals to the subcarriers in the idle band upon the PAPR of the data signal being tend to decrease.

(8) The transmitter may further comprise: PAPR reduction signal generation means for generating, as the signals other than the data signal, PAPR reduction signals for reducing a PAPR of the data signal; and pilot generation means for generating pilot signals as the signals other than the data signal, wherein the control means may control the subcarrier allocation means to allocate, upon the PAPR of the data signal being tend to increase, the PAPR reduction signals and the pilot signals to the subcarriers in the idle band such that a number of the PAPR reduction signals is larger than a number of the pilot signals, and may control the subcarrier allocation means to allocate, upon the PAPR of the data signal being tend to decrease, the PAPR reduction signals and the pilot signals to the subcarriers in the idle band such that the number of the pilot signals is larger than the number of the PAPR reduction signals.

(9) The transmitter may further comprise waveform shaping means for performing a waveform shaping processing for reducing a PAPR of the data signal, wherein the control means may control the waveform shaping means to perform the waveform shaping processing on the data signal upon the PAPR of the data signal being tend to increase.

(10) A transmission method of the present invention comprises: a time/frequency-domain conversion step of converting a time-domain data signal to a frequency-domain data signal of a fixed number; a subcarrier allocation step of allocating the frequency-domain data signal obtained in the time/frequency-domain conversion step to any of subcarriers, a number of which exceeds the fixed number, the subcarriers being allocated in a predetermined transmission frequency band; and a control step of controlling the subcarrier allocation step to allocate signals other than the data signal to subcarriers in an idle band to which the data signal is not allocated.

According to the present invention, at least any of the following effects or advantages can be obtained.

(1) With the number of conversions from a time-domain data signal to a frequency-domain data signal being fixed, signals other than the data signal can be allocated (mapped) to subcarriers in an idle band of a transmission frequency band; thus, without the need to prepare a plurality of time/frequency-domain conversion circuits with a large size and without increasing the circuit size, frequency utilization efficiency can be improved.

(2) Here, by performing the subcarrier allocation such that the signals other than the data signal are uniformly arranged in the transmission frequency band, desired transmission or reception characteristics can be obtained over the entire transmission frequency band while frequency utilization efficiency is improved.

(3) For example, by allocating PAPR reduction signals to the subcarriers in the idle band, the PAPR can be reduced, and by allocating pilot signals, the number of pilot signals can be increased; thus, the channel estimation accuracy of a receiving end of the data signal is improved, which in turn improves demodulation capability.

(4) Additionally, in the case where the PAPR tends to increase such as the case where the data signal is 16 QAM-modulated, a waveform shaping processing for reducing the PAPR is performed on the data signal and/or PAPR reduction signals are allocated to the subcarriers in the idle band, whereby while frequency utilization efficiency is improved, a reduction in PAPR is achieved.

(5) In the case where the PAPR tends to decrease such as the case where the data signal is QPSK-modulated, pilot signals are allocated to the subcarriers in the idle band, whereby while frequency utilization efficiency is improved, the channel estimation accuracy of a receiving end of the data signal is improved, which in turn improves demodulation capability.

(6) Furthermore, according to the value of the PAPR of the data signal (according to whether the modulation scheme is 16 QAM or QPSK), the ratio of PAPR reduction signals to pilot signals to be allocated to the subcarriers in the idle band is controlled (e.g., for the former case the number of PAPR reduction signals is increased, and for the latter case the number of pilot signals is increased), whereby while frequency utilization efficiency is improved and the PAPR is reduced, the channel estimation accuracy of a receiving end and demodulation capability can be improved.

(7) If the number of conversions (fixed number) from a time-domain data signal to a frequency-domain data signal can be set to a value which is a power of two, an FFT can be applied to the time/frequency domain conversion means; thus, the circuit size can be significantly reduced as compared with the case of using a DFT.

The above and other objects and features of the present invention will be understood by reading carefully the following description with accompanying drawings. Preferred embodiments of the present invention will be described in more detail referring to the accompanying drawings. The drawings are illustrative and are not to be limitative of the scope of the present invention.

BRIEF DESCRIPTION OF THE DRAWINGS

FIG. 2A is a diagram showing an operation in which in the case where 16 QAM modulation is performed by a modulator shown in FIG. 1, a waveform shaping (band limitation) processing using a window function with the roll-off rate $\alpha$ being 0.1 is performed on a data signal, FIG. 2B is a diagram showing an operation in which in the case where QPSK modulation is performed by the modulator shown in FIG. 1, pilot signals are inserted in an idle band;

FIG. 6A is a diagram showing an operation in which in the case where 16 QAM modulation is performed by a modulator shown in FIG. 5, PAPR reduction signals are inserted in an idle band, FIG. 6B is a diagram showing an operation in which in the case where QPSK modulation is performed by the modulator shown in FIG. 5, pilot signals are inserted in the idle band;

DESCRIPTION OF THE PREFERRED EMBODIMENTS

Preferred embodiments of the present invention will be described in more detail below with reference to the accompanying drawings.

(A) Description of a First Embodiment

Figure 1:
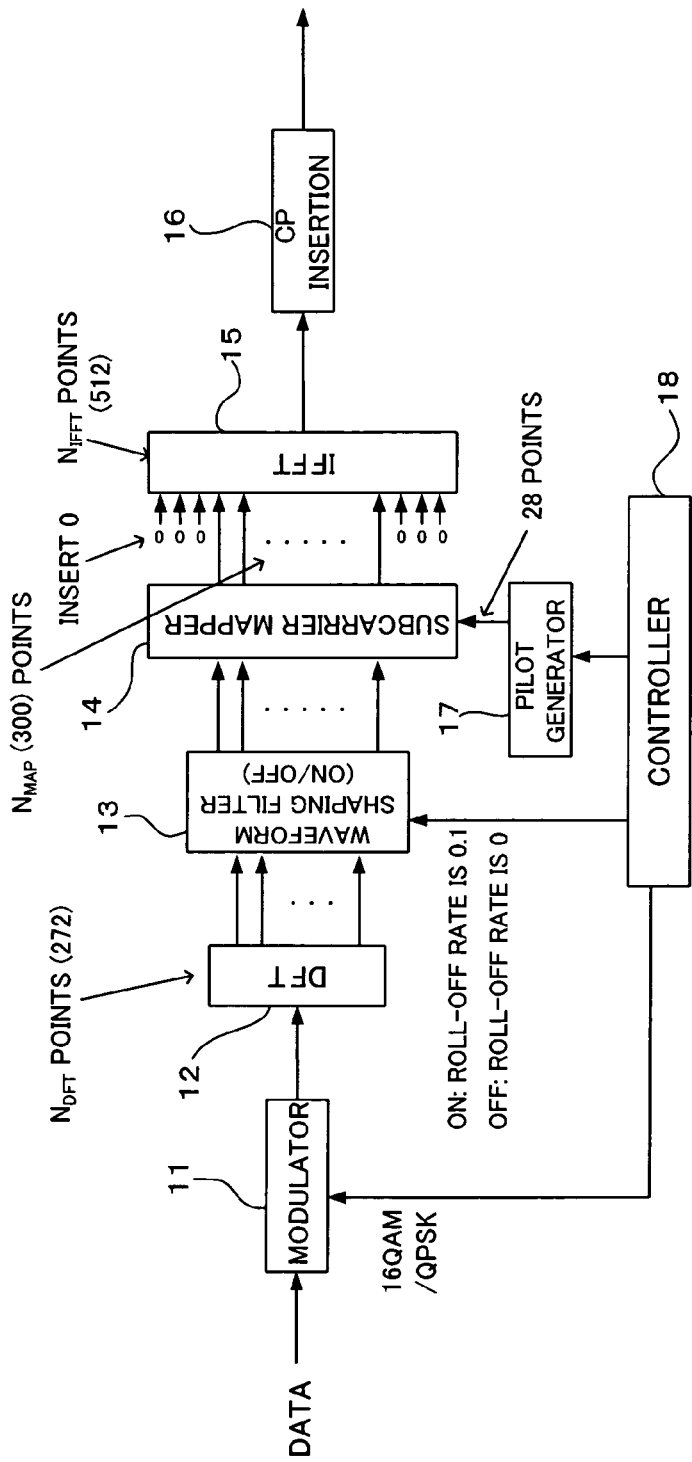
FIG. 1 is a block diagram showing a configuration of an essential part of a DFT-S-OFDM transmitter according to a first embodiment of the present invention.

FIG. 1 is a block diagram showing a configuration of an essential part of a DFT-S-OFDM transmitter according to a first embodiment of the present invention. A DFT-S-OFDM transmitter (hereinafter also simply referred to as the "transmitter") shown in FIG. 1 can be applied, as will be described later in FIG. 3, for example, to a mobile station apparatus that adopts the DFT-S-OFDM scheme for at least an uplink in a mobile communication system. The DFT-S-OFDM transmitter includes a modulator 11, a DFT 12, a waveform shaping filter 13, a subcarrier mapper 14, an IFFT 15, a CP inserter 16, a pilot generator 17, and a controller 18.

The modulator 11 modulates a data-channel data (symbols) to be transmitted (hereinafter also referred to as a "data channel signal" or "data signal") by a required modulation scheme such as QPSK or 16 QAM. In the present example, the modulation scheme can be adaptively changed by control from the controller 18.

The DFT (time/frequency-domain conversion means) 12 performs an $N_{DFT}$-point DFT processing on every block of the data channel signal having been modulated by the modulator 11, the block being composed of $N_{DFT}$ (e.g., 272) symbols, whereby the signal is converted from a time-domain signal to a frequency-domain signal. In the present example, the DFT processing is performed without changing the number of $N_{DFT}$ points (i.e., the DFT size) but with a certain (fixed) DFT size. Therefore, the DFT-processed modulated data signal is converted to a signal composed of a fixed number $N_{DFT}$ (=272) of subcarriers, regardless of the type of the modulation scheme (16 QAM/QPSK).

The waveform shaping filter (band limiting filter; waveform shaping means) 13 selectively performs a waveform shaping processing that uses a window function, on the data signal having been subjected to a DFT processing in the DFT 12, according to control from the controller 18 and thereby performs band limitation for reducing the PAPR. Here, for example, in the case where a control signal from the controller 18 is ON (in the case where the modulation scheme is 16 QAM), a waveform shaping (band limitation) processing using a window function with the roll-off rate α being 0.1, as shown in FIG. 2A, is performed; and in the case where the control signal is OFF (in the case where the modulation scheme is QPSK), a waveform shaping processing is not performed and an output from the DFT 12 is directly output to the subcarrier mapper 14 (i.e., band limitation using a window function with the roll-off rate α being 0 is performed).

The subcarrier mapper (subcarrier allocator) 14 can allocate (map) an input signal (symbols) of $N_{MAP}$ (>$N_{DFT}$) (e.g., $N_{MAP}$=300) to a frequency axis of a transmission frequency band (i.e., the signal is mapped onto $N_{MAP}$ subcarriers); however, here, under control of the controller 18, pilot signals are input from the pilot generator 17 to redundancies ($N_{MAP}$−$N_{DFT}$=28 points) resulting from the fact that in the case where the modulation scheme in the modulator 11 is QPSK, only symbols of $N_{DFT}$ (=272) which is smaller than $N_{MAP}$ is input from the waveform shaping filter 13.

Namely, the transmitter according to the present example can insert, in the case where QPSK modulation is performed, pilot symbols which are symbols different from data symbols, in a subcarrier frequency of an idle band of a transmission frequency band where data symbols are not mapped. At that time, it is preferable that subcarriers onto which the pilot symbols are mapped be distributed (preferably uniformly) and arranged in the transmission frequency band (effective subcarrier frequency band) (see FIG. 2B, for example). Note that for 16 QAM modulation, such pilot symbol insertion is not performed.

The pilot generator 17 generates, under control from the controller 18, pilot symbols (28-point pilot symbols in the present example) to be mapped onto subcarriers in the idle band for the case of QPSK modulation.

The IFFT 15 performs an $N_{IFFT}$-point IFFT processing on the symbols (data symbols or data symbols and pilot symbols) onto which subcarriers have been mapped by the subcarrier mapper 14 as described above, whereby the signal is converted from the frequency-domain signal to a time-domain signal again. An example of FIG. 1 shows an operation in which an output of 300 points from the subcarrier mapper 14 is arranged on an $N_{IFFT}$ (=512)-point IFFT (subcarriers) and a zero signal is inserted in the remaining 212 points. Note that mapping onto subcarriers may be performed in a localized arrangement or a distributed arrangement.

The CP inserter 16 adds (time-multiplexes) CPs to the IFFT-processed time-domain signal. The controller 18 controls the modulation scheme (16 QAM or QPSK) in the modulator 11, the ON/OFF of the waveform shaping filter 13, the processing of generating, by the pilot generator 17, pilot symbols (hereinafter also simply referred to as "pilots") to be inserted in the idle band, and the arrangement (insertion) of the pilot symbols on a frequency axis.

More specifically, as described above, at the time of 16 QAM modulation, the controller 18 controls the waveform shaping filter 13 to be ON in order to apply waveform shaping (band limitation) with the roll-off rate α being 0.1, and controls to stop (invalidate) the processing of generating (inserting) pilots by the pilot generator 17. At the time of QPSK modulation, the controller 18 controls the waveform shaping filter 13 to be OFF in order to apply band limitation with the roll-off rate α being 0 (i.e., no limitation), and controls to validate the processing of generating (inserting) pilots by the pilot generator 17. Note that the modulation scheme adopted in the modulator 11 is specified by, for example, control information received from a base transceiver station, as will be described later.

An operation of the transmitter according to the present embodiment which is configured in the above-described manner will be described below. First, a transmission data channel signal is 16 QAM- or QPSK-modulated by the modulator 11. Thereafter, the modulated signal is subjected to a DFT processing with a fixed DFT size ($N_{DFT}$ points) in the DFT 12, whereby the signal is converted to a frequency-domain data signal. The frequency-domain data signal is then input to the waveform shaping filter 13.

The waveform shaping filter 13 is controlled to be ON by the controller 18 in the case where the modulation scheme is 16 QAM. As shown in FIG. 2A, the waveform shaping filter 13 performs band limitation with a roll-off rate being 0.1 on an output from the DFT 13. Band-limited $N_{MAP}$ (=300)-point data symbols are input to the subcarrier mapper 14. At this time, pilot symbols are not input from the pilot generator 17 by control of the controller 18.

Thus, the subcarrier mapper 14 arranges (maps) the $N_{MAP}$ (=300)-point data symbols on an $N_{IFFT}$ (=512)-point IFFT (subcarrier frequency). A zero signal, for example, is inserted (mapped) in the remaining 212-point subcarrier frequency.

On the other hand, in the case where the modulation scheme is QPSK, the waveform shaping filter 13 is controlled to be OFF by the controller 18 and thus band limitation by the waveform shaping filter 13 is not performed and $N_{DFT}$ (=272)-point data symbols are directly input to the subcarrier mapper 14 (i.e., band limitation with the roll-off rate α being 0 is performed). In this case, by control of the controller 18, the generation and insertion of pilots by the pilot generator 17 are validated and thus pilot symbols to be mapped onto idle band ($N_{MAP}-N_{DFT}$=28) subcarriers are input from the pilot generator 17.

Accordingly, the subcarrier mapper 14 arranges the $N_{DFT}$=272-point data symbols and the 28-point pilot symbols (300-point symbols in total) on an $N_{IFFT}$=512-point IFFT (subcarrier frequency). At that time, as shown in FIG. 2B, for example, the pilot symbols are distributed (uniformly) and arranged in an effective subcarrier band (in this case too, a zero signal, for example, is inserted in the remaining 212-point subcarrier frequency).

This allows a receiving end to perform channel estimation over the entire effective subcarrier band, making it possible to improve demodulation characteristics. In the case where there are not many pilot symbols to be inserted in the idle band, by arranging the pilots such that the insertion location of a pilot is displaced for each block in one-frame interval, correct channel estimation can be performed over the entire effective subcarrier band.

The signal onto which the subcarriers have been mapped as described above is subjected to an IFFT processing in the IFFT 15, whereby the signal is converted to a time-domain signal. Then, CPs are added (time-multiplexed) to the time-domain signal by the CP inserter 16 and the CP-added signal is output to a radio transmission processing block (not shown).

By inserting pilots in the idle band, as described above, effective utilization of a frequency is achieved, but the PAPR increases. However, the PAPR of a QPSK-modulated data signal is lower than that of a 16 QAM-modulated data signal, and thus, even if the PAPR is increased, the PAPR of the QPSK-modulated data signal can be suppressed to a level less than or comparable to the PAPR of the 16 QAM-modulated data signal (or each parameter is set such that the level less than or comparable to the PAPR of the 16 QAM-modulated data signal is obtained).

Figure 9:
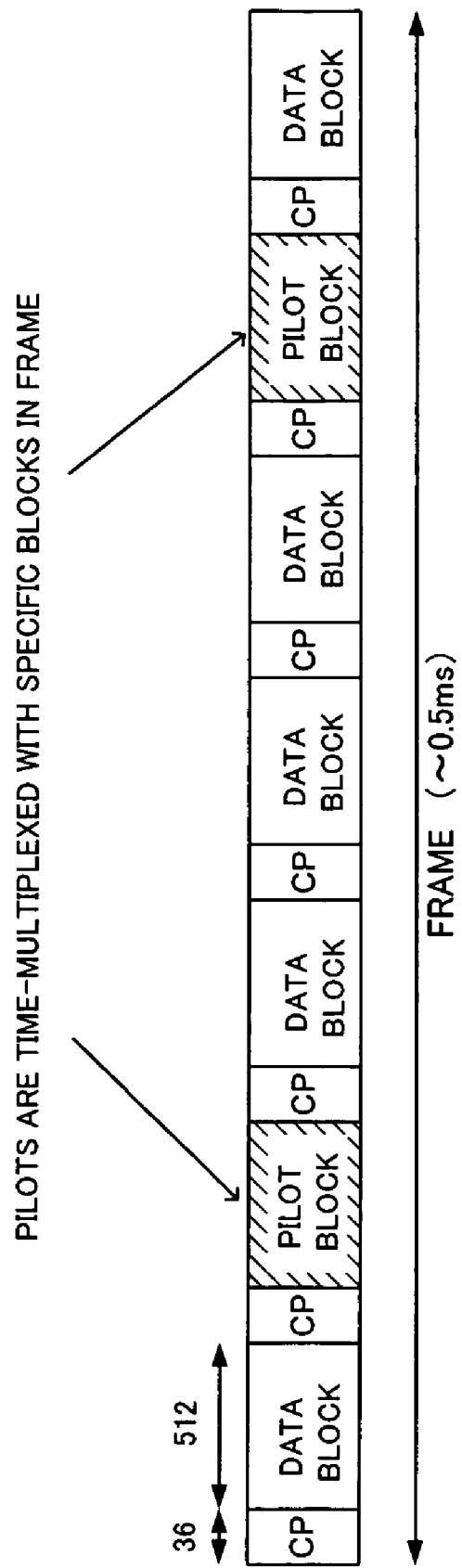
FIG. 9 is a diagram showing an exemplary configuration of a transmission frame of the transmitter shown in FIG. 8.
Figure 10:
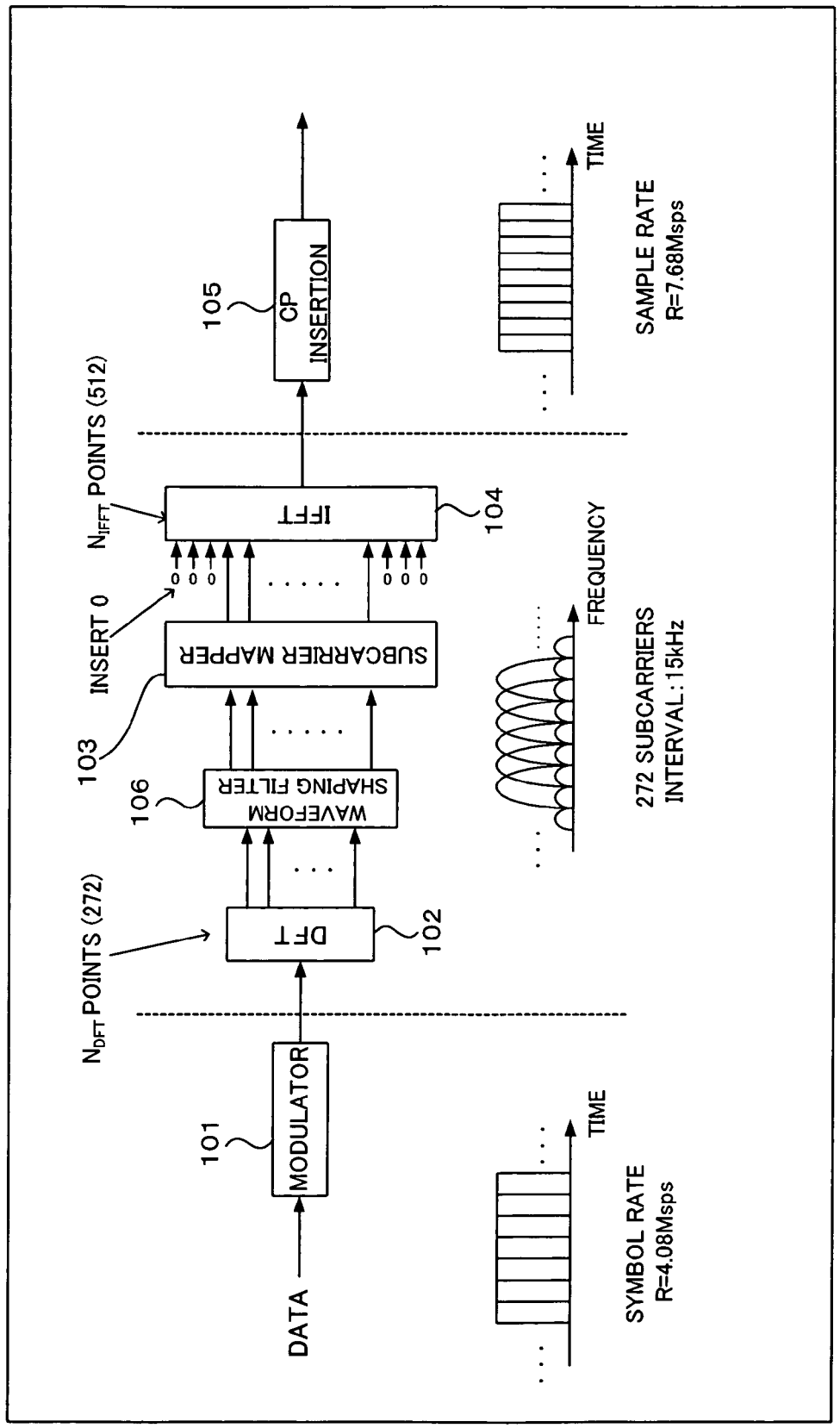
FIG. 10 is a block diagram showing a configuration of a transmitter based on the configuration shown in FIG. 8 for the case in which band limitation (waveform shaping) is performed on a data signal.
Figure 11:
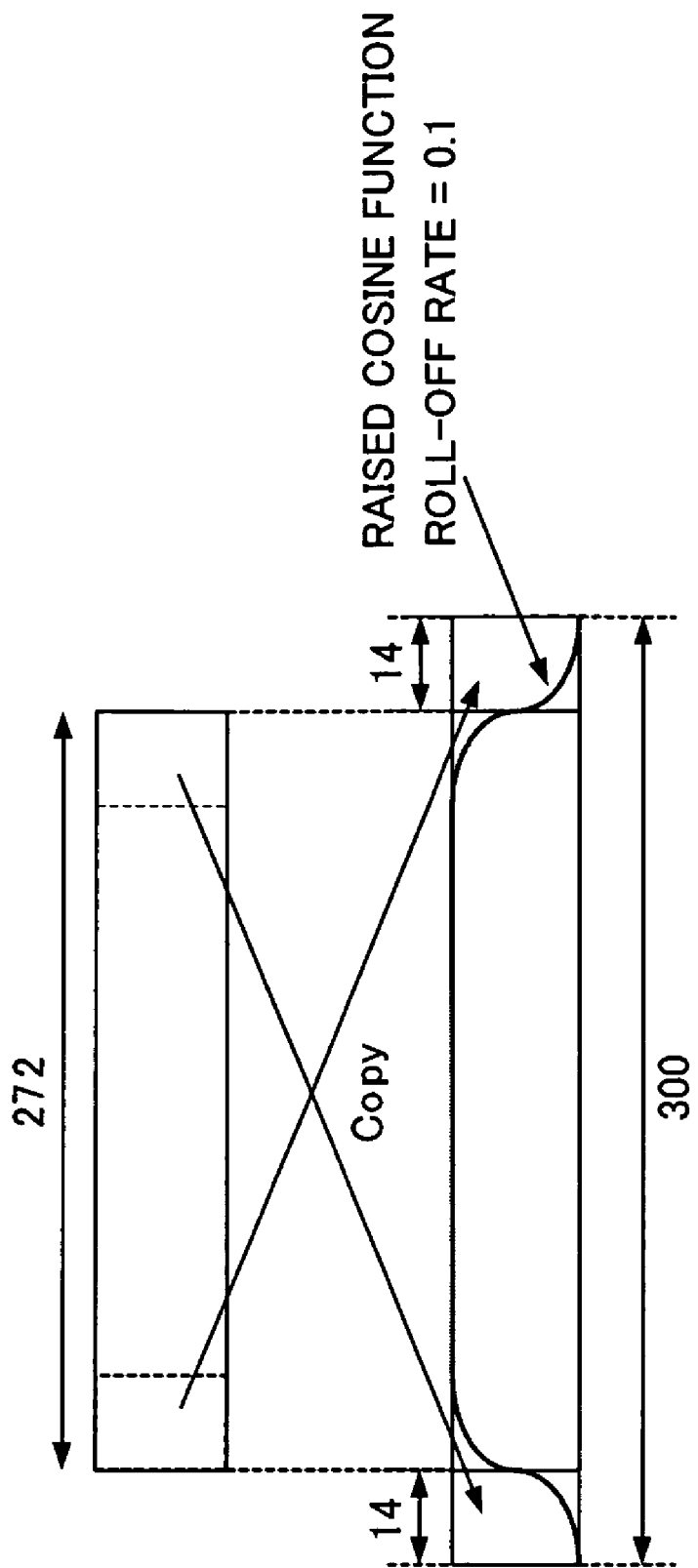
FIG. 11 is a diagram showing an operation of the waveform shaping (band limitation) by a waveform shaping filter shown in FIG. 10.

In the DFT-S-OFDM, although pilot symbols are time-multiplexed with specific blocks in a frame, as shown in FIG. 9, in the case where pilots are inserted in an idle band of data symbols, as described above, part or all of the pilots in the pilot blocks can be eliminated. Therefore, instead of part or all of the pilots in the pilot blocks, data symbols can be inserted. By doing so, not only the amount of pilot symbols but also the amount of data symbols are increased, making it possible to further improve frequency utilization efficiency.

As described above, in the transmitter according to the present example, with the DFT size being fixed, the roll-off rate α of the waveform shaping filter 13 can be changed according to the PAPR characteristics of a data signal and pilots can be inserted in an idle-band subcarrier frequency as signals other than the data signal. Accordingly, without increasing the circuit size and with an increase in PAPR being suppressed, a provided transmission frequency band can be effectively used; in addition, by the increase and distributed arrangement of inserted pilots in the transmission frequency band, the channel estimation accuracy of a receiving end is improved and thus demodulation characteristics can be improved.

Namely, since the DFT size is fixed, there is no need to prepare a plurality of DFT circuits with a large size and thus without increasing the circuit size, frequency utilization efficiency can be improved. Here, if the fixed DFT size can be set to a value which is a power of two, an FFT can be used; thus, the circuit size can be further reduced as compared with the case where using a DFT.

(A1) Example of an Application to a Mobile Station Apparatus

Figure 3:
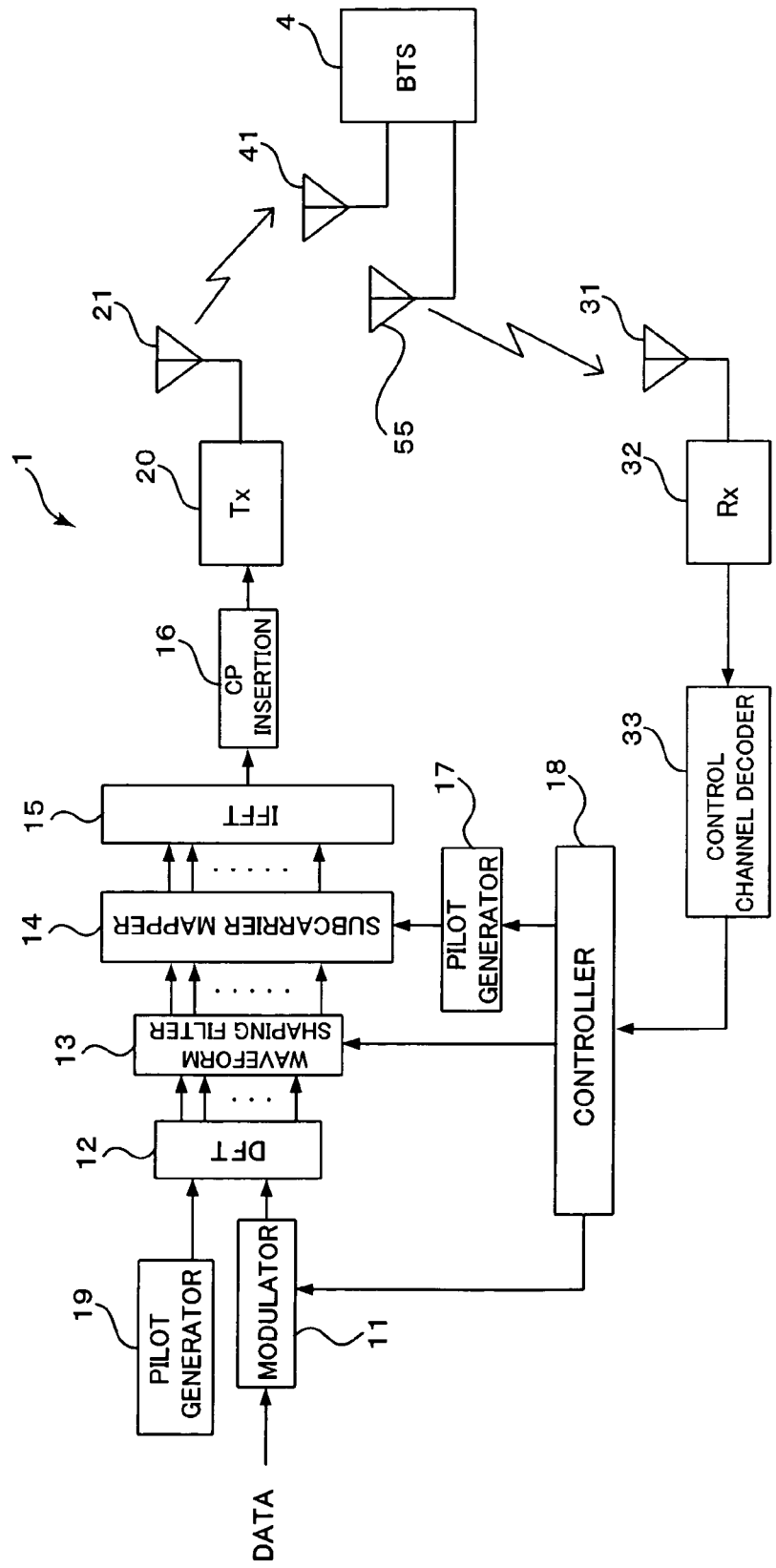
FIG. 3 is a block diagram showing a configuration of a mobile station apparatus in a mobile communication system, to which the configuration of the DFT-S-OFDM transmitter which is shown in FIG. 1 is applied.

FIG. 3 shows a configuration of a mobile station apparatus (hereinafter simply referred to as the "mobile station") in a mobile communication system, to which the configuration of the DFT-S-OFDM transmitter described in FIG. 1 is applied. A mobile station (MS) 1 shown in FIG. 3 performs radio communication with a base transceiver station (BTS) 4 that composes the mobile communication system. The mobile station 1 performs communication by the DFT-S-OFDM scheme for at least an uplink to the BTS 4.

The MS 1 according to the present example includes, as an uplink transmission system, for example, the modulator 11, the DFT 12, the waveform shaping filter 13, the subcarrier mapper 14, the IFFT 15, the CP inserter 16, and the pilot generator 17, which are described above, and a pilot generator 19, a radio transmitter (Tx) 20, and a transmission antenna 21. As a down link reception system, the MS 1 includes, for example, a reception antenna 31, a radio receiver (Rx) 32, and a control channel decoder 33. Furthermore, the MS 1 includes a controller 18 that controls the operation of the transmission and reception systems.

Figure 4:
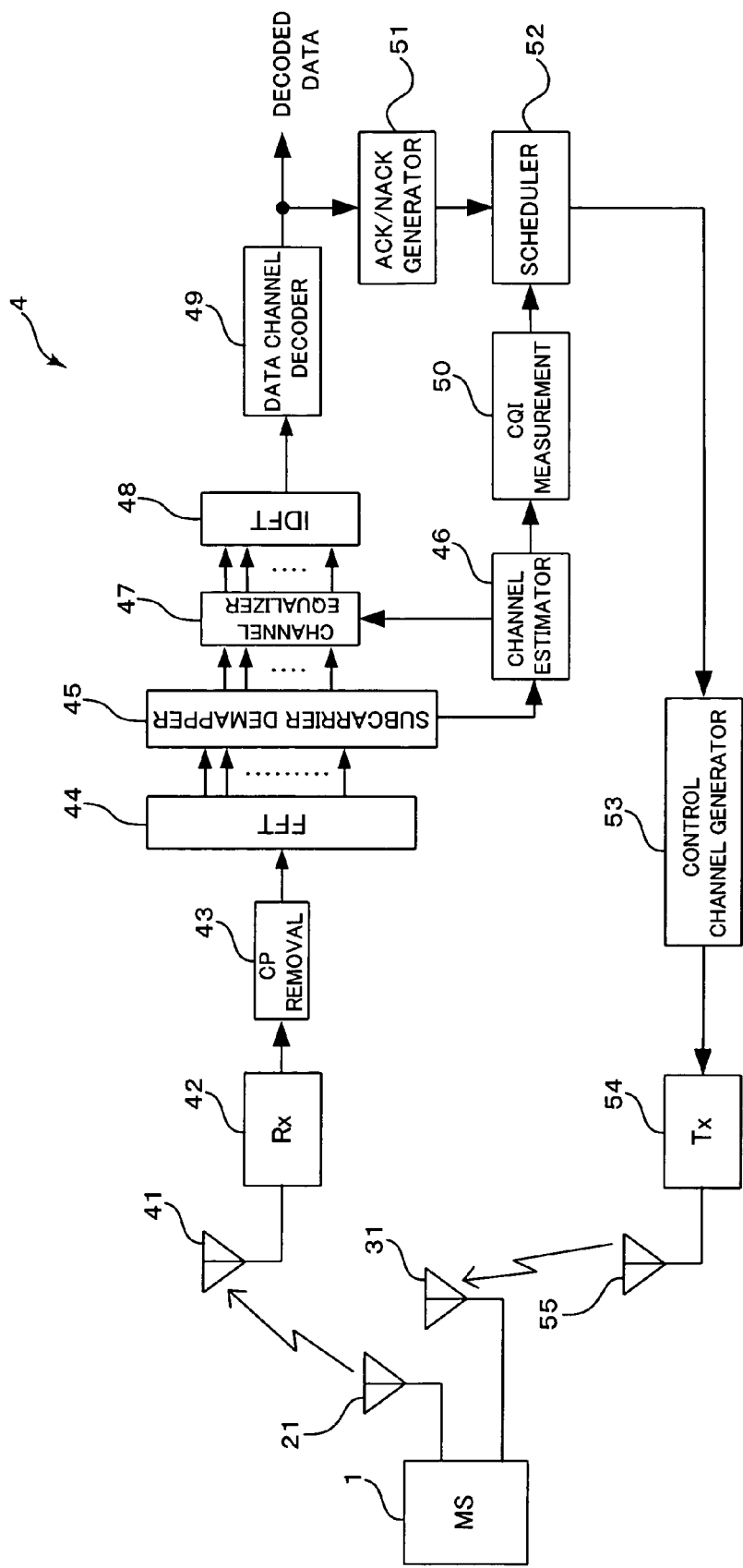
FIG. 4 is a block diagram showing a configuration of a base transceiver station that communicates with the mobile station apparatus shown in FIG. 3.

The BTS 4 includes, as an uplink reception system, as shown in FIG. 4, for example, a reception antenna 41, a radio receiver (Rx) 42, a CP remover 43, an FFT 44, a subcarrier demapper 45, a channel estimator 46, a channel equalizer 47, an IDFT (Inverse Discrete Fourier Transformer) 48, a data channel decoder 49, a CQI measure 50, an ACK/NACK generator 51, and a scheduler 52. As a down link transmission system, the BTS 4 includes a control channel generator 53, a radio transmitter (Tx) 54, and a transmission antenna 55.

In the MS 1 shown in FIG. 3, the pilot generator 19 generates pilots in pilot blocks, as described above in FIG. 9. The pilots are input to the DFT 12 along with a data channel signal modulated by the modulator 11 and the pilots and signal are subjected to an $N_{DFT}$-point DFT processing.

The radio transmitter 20 performs necessary radio transmission processings including D/A (digital/analog) conversion and frequency conversion (up conversion) to a radio frequency (RF), on the data signal to which CPs are added by the CP inserter 16, and thereby generates an uplink RF signal. The transmission antenna 21 radiates the RF signal into space toward the BTS 4.

The reception antenna 31 receives a down link RF signal transmitted from the BTS 4. The radio receiver 32 performs necessary radio reception processings including frequency conversion (down conversion) to a baseband frequency, A/D (analog/digital) conversion, and the like, on the RF signal received by the reception antenna 31.

The control channel decoder 33 decodes control channel data (control information) included in the down link signal having been processed by the radio receiver 32. Based on the control information, the controller 18 controls, as described above, the operation of the modulator 11, the waveform shaping filter 13, and the pilot generator 17.

On the other hand, in the BTS 4 shown in FIG. 4, the reception antenna 41 receives an uplink RF signal transmitted from the MS 1. The radio receiver 42 performs, as in the MS 1, necessary radio reception processings including down conversion to a baseband frequency, A/D conversion, and the like, on the RF signal. The CP remover 43 removes the CPs which are added to a data signal by the MS 1.

The FFT 44 performs an $N_{FFT}$-point (e.g., $N_{FFT}=N_{IFFT}=512$ points) FFT processing on the received signal from which the CPs have been removed by the CP remover 43, whereby the signal is converted from a time-domain signal to a frequency-domain signal.

The subcarrier demapper 45 extracts (demaps) a signal (symbols) mapped onto subcarriers in the FFT-processed received signal, and thereby demultiplexes the signal into pilot symbols and data symbols. The pilot symbols are sent to the channel estimator 46 and the data symbols are sent to the channel equalizer 47.

The channel estimator 46 computes a correlation, for each subcarrier, between the pilot symbols and replicas thereof (pilot replicas) and thereby determines a channel estimation value for each subcarrier. The channel equalizer (channel compensator) 47 performs, using the channel estimation values, channel equalization (channel compensation) on the data symbols sent from the subcarrier demapper 45.

The IDFT 48 performs an $N_{IDFT}$-point (e.g., $N_{IDFT}=N_{DFT}=272$ points) IDFT processing on the channel-equalized data symbols, whereby the signal is converted from a frequency-domain signal to a time-domain signal. The data channel decoder 49 decodes (e.g., turbo decodes) the time-domain data signal by a decoding scheme that is appropriate for a coding scheme in the MS 1.

The ACK/NACK generator 51 verifies a result of the decoding performed by the data channel decoder 49, by CRC computation or the like. If the result is normal (OK), the ACK/NACK generator 51 generates ACK information. If the result is abnormal (NG), the ACK/NACK generator 51 generates NACK information. The ACK/NACK information is input to the scheduler 52 and used for uplink scheduling.

The CQI measure 50 measures a CQI (Channel Quality Indicator) which is an index of uplink reception quality, based on the channel estimation values obtained by the channel estimator 46. The CQI is also input to the scheduler 52 and used for uplink scheduling.

The scheduler 52 determines at least an MS 1 that is permitted for transmission in an uplink and a modulation scheme (16 QAM or QPSK) used by the MS 1, based on the ACK/NACK information and the CQI. Then, the scheduler 52 notifies the MS 1 of that information (transmission permission information and modulation scheme information) by a down link control channel.

The control channel generator 53 generates a down link control channel signal based on the information from the scheduler 52. The radio transmitter 54 performs necessary radio transmission processings including D/A conversion, up conversion to an RF signal, and the like, on a down link channel signal including the control channel signal. The transmission antenna 55 radiates a down link RF signal obtained by the radio transmitter 54 into space toward the MS 1.

Now, an operation of the mobile communication system (an MS 1 and a BTS 4) configured in the above-described manner will be described below.

First, in the BTS 4, an uplink RF signal transmitted from the MS 1 is received by the reception antenna 41. The received signal is subjected to the radio reception processings in the radio receiver 42. Then, the CP remover 43 removes CPs from the processed signal and the CP-removed signal is input to the FFT 44.

The FFT 44 performs an FFT processing on the CP-removed received signal, whereby the signal is converted from a time-domain signal to a frequency-domain signal. The obtained frequency-domain signal is input to the subcarrier demapper 45 where a signal (pilot symbols and data symbols) which is mapped onto each subcarrier is extracted. The pilot symbols are input to the channel estimator 46 and the data symbols are input to the channel equalizer 47.

The channel estimator 46 computes a correlation between the received pilot symbols mapped for each subcarrier and pilot replicas and thereby determines a channel estimation value for each subcarrier. Then, the channel estimator 46 inputs the obtained channel estimation values to each of the channel equalizer 47 and the CQI measure 50.

The channel equalizer 47 performs, based on the channel estimation value for each subcarrier, channel equalization (channel compensation), for each subcarrier, on the data symbols from the subcarrier demapper 45. The channel-equalized data channel signal is decoded by the data channel decoder 49. If a result of the decoding is normal, the ACK/NACK generator 51 generates ACK information and if the result of the decoding is abnormal, the ACK/NACK generator 51 generates NACK information. The CQI measure 50 measures a CQI based on the channel estimation value for each subcarrier.

The ACK/NACK information and the CQI are input to the scheduler 52. The scheduler 52 determines an MS 1 that is permitted for transmission in an uplink and a modulation scheme (16 QAM or QPSK) used by the MS 1, based on the ACK/NACK information and the CQI. The scheduler 52 then notifies the MS 1 of that information (modulation scheme information) by a down link control channel via the control channel generator 53, the radio transmitter 54, and the transmission antenna 55.

The control channel signal is received by the reception antenna 31 of the MS 1 and the received signal is subjected to the radio reception processings in the radio receiver 32. Then, the processed signal is decoded by the control channel decoder 33 and the decoded signal is input to the controller 18. Decoded control information includes information on transmission permission for the MS 1 and information on a modulation scheme to be used for uplink transmission.

Based on the modulation scheme information, the controller 18 controls, as described above, the operation of an uplink transmission system (the modulator 11, the waveform shaping filter 13, and the pilot generator 17). Specifically, in the case where the modulation scheme information indicates 16 QAM, the controller 18 sets the modulation scheme used in the modulator 11 to 16 QAM and controls the waveform shaping filter 13 to be ON and controls to invalidate mapping of pilots onto subcarriers in an idle band by the pilot generator 17.

By this, an uplink data signal from the MS 1 to the BTS 4 is 16 QAM-modulated by the modulator 11 and the modulated signal is subjected to a DFT processing in the DFT 12, whereby the signal is converted to a frequency-domain signal. Thereafter, the frequency-domain signal is subjected to band limitation using a window function with the roll-off rate α being 0.1 in the waveform shaping filter 13 (see FIG. 2A). Then, the band-limited signal is mapped onto each subcarrier and CPs are added to the subcarrier-mapped signal by the subcarrier mapper 14, the IFFT 15, and the CP inserter 16. The CP-added signal is then transmitted toward the BTS 4 via the radio transmitter 20 and the transmission antenna 21.

On the other hand, in the case where the modulation scheme information indicates QPSK, the controller 18 sets the modulation scheme used in the modulator 11 to QPSK and controls the waveform shaping filter 13 to be OFF and controls to validate mapping of pilots to subcarriers in an idle band by the pilot generator 17.

By this, an uplink data signal from the MS 1 to the BTS 4 is QPSK-modulated by the modulator 11 and the modulated signal is DFT-processed by the DFT 12, whereby the signal is converted to a frequency-domain signal. Thereafter, the frequency-domain signal directly passes through the waveform shaping filter 13 (band limitation using a window function with the roll-off rate α being 0 is performed). The signal is then input to the subcarrier mapper 14.

The subcarrier mapper 14 maps, as described in FIG. 1, data symbols from the waveform shaping filter 13 onto subcarriers (on the IFFT) in a frequency domain, and maps pilot symbols from the pilot generator 17 onto subcarriers in an idle band and distributes (uniformly) and arranges the pilot symbols in an effective subcarrier frequency band.

By this, in the BTS 4, as described above, it becomes possible for the channel estimator 46 to perform channel estimation over the entire effective subcarrier band and thus the demodulation characteristics of the BTS 4 can be improved. In addition, by eliminating pilots to be generated by the pilot generator 19 and instead by increasing the number of data symbols modulated by the modulator 11, not only the number of pilot symbols but also the number of data symbols are increased, making it possible to improve the frequency utilization efficiency.

Each symbol onto which a subcarrier is mapped as described above is subjected to an IFFT processing in the IFFT 15, whereby the signal is converted to a time-domain signal. Thereafter, CPs are added to the time-domain signal by the CP inserter 16 and then the CP-added signal is transmitted toward the BTS 4 via the radio transmitter 20 and the transmission antenna 21.

As described above, by applying the configuration of the transmitter described in FIG. 1 to an MS 1, without increasing the circuit size of the MS 1 and with an increase in PAPR being suppressed, it is possible to achieve effective utilization of a provided transmission frequency band, an increase in the number of inserted pilots in the transmission frequency band, the channel estimation accuracy of a BTS 4 by a distributed arrangement, and an improvement in demodulation characteristics.

(B) Description of a Second Embodiment

Figure 5:
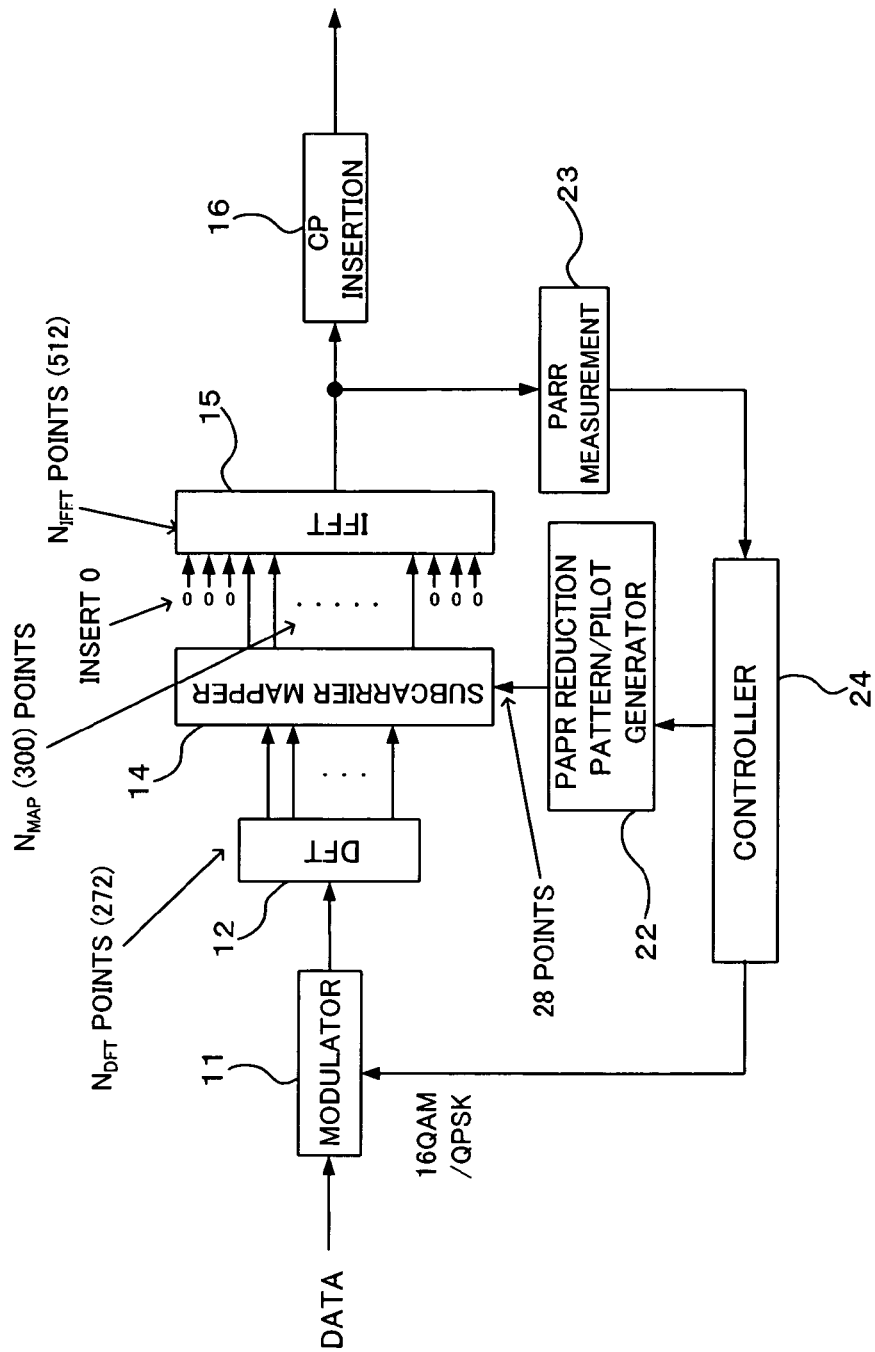
FIG. 5 is a block diagram showing a second embodiment of the DFT-S-OFDM transmitter shown in FIG. 1.

FIG. 5 is a block diagram showing a second embodiment of the DFT-S-OFDM transmitter described above in FIG. 1. The transmitter shown in FIG. 5 can also be applied to a transmission system of an MS 1, as in the configuration shown above in FIG. 3. The configuration shown in FIG. 5 is different from that shown in FIG. 1 in that the waveform shaping filter 13 is eliminated and a PAPR reduction pattern/pilot generator 22 and a controller 24 are provided in place of the pilot generator 17 and the controller 18, and a PAPR measure 23 is additionally provided. Note that in FIG. 5 elements denoted by the same reference numerals as those described above represent the same or similar elements as/to those described above, unless otherwise specified.

The PAPR reduction pattern/pilot generator (PAPR reduction signal generation means and pilot signal generation means) 22 generates a signal (symbols) (hereinafter referred to as a "PAPR reduction signal") having a pattern (phase) that reduces the PAPR and generates a pilot symbol. In the present example, the PAPR reduction pattern/pilot generator 22 can generate signals with a plurality of types of patterns as the PAPR reduction signal. In the case where a data signal is modulated by a modulation scheme with which the PAPR tends to increase, such as 16 QAM modulation, a PAPR reduction signal with any one pattern is selectively inserted in the idle band through the subcarrier mapper 14. In the case where a data signal is modulated by a modulation scheme with which the PAPR tends to decrease as compared with 16 QAM modulation, such as QPSK modulation, pilots are inserted in the idle band through the subcarrier mapper 14.

That is, the subcarrier mapper 14 according to the present example can selectively map PAPR reduction signals or pilots onto subcarriers in the idle band according to the PAPR characteristics (characteristics that depend on a modulation scheme) of a data channel signal to be transmitted. In the case of 16 QAM modulation, by mapping PAPR reduction signals onto the subcarriers in the idle band, the same effect as that obtained by band limitation using a window function with the roll-off rate α being 0.1 in the first embodiment can be obtained.

The PAPR measure 23 measures the PAPR of an IFFT-processed data signal, based on an output from the IFFT 15. The controller 24 controls (specifies), as in the aforementioned first embodiment, a modulation scheme (16 QAM or QPSK) in the modulator 11 and instructs the PAPR reduction pattern/pilot generator 22 about signals (PAPR reduction signals or pilots) to be mapped onto the subcarriers in the idle band. Here, if the modulation scheme is 16 QAM, the controller 24 provides to the subcarrier mapper 14 an instruction to output PAPR reduction signals, and if the modulation scheme is QPSK, the controller 24 provides to the subcarrier mapper 14 an instruction to output pilots.

In the case where an instruction to output PAPR reduction signals is provided, the controller 24 provides an instruction to sequentially output PAPR reduction signals with different patterns in a predetermined cycle with any of the plurality of types of patterns being used as an initial pattern. Then, a pattern having the lowest PAPR measurement result by the PAPR measure 23 is selected and determined as a pattern to be finally mapped to the subcarriers in the idle band. Note that normally by preparing only a few patterns for a PAPR reduction signal, sufficient effect to reduce the PAPR is obtained. Note also that the PAPR reduction pattern/pilot generator 22 may be not configured to be shared by a PAPR reduction signal and a pilot and may be configured by individual generators.

In the transmitter according to the present embodiment which is configured in the above-described manner, a transmission data channel signal is modulated by the modulator 11 by a modulation scheme specified by the controller 24. The modulated signal is input to the DFT 12 and subjected to an $N_{DFT}$-point (e.g., 272-point) fixed DFT processing in the DFT 12, whereby the signal is converted to a frequency-domain signal. Then, the frequency-domain signal is input to the subcarrier mapper 14.

The subcarrier mapper 14 maps (localized or distributed arrangement) the DFT-processed data signal onto $N_{MAP}$-point (e.g., 300-point) subcarriers (frequency) in a transmission frequency band on a frequency axis (IFFT), and maps PAPR reduction signals or pilots from the PAPR reduction pattern/pilot generator 22 onto idle-band ($N_{MAP}-N_{DFT}$ points; for example, 300−272=28 points) subcarriers.

Namely, in the case of 16 QAM modulation, the PAPR of the data signal tends to increase and thus, as shown in FIG. 6A, for example, PAPR reduction signals with any of the plurality of types of patterns are arranged in the idle band and the PAPR reduction signals are distributed (uniformly) and arranged in an effective subcarrier frequency band. In the case of QPSK modulation, the PAPR tends to decrease as compared with the case of 16 QAM modulation and thus as shown in FIG. 6B, for example, as in the first embodiment, pilots are (uniformly) arranged in the idle band and the pilots are distributed (uniformly) and arranged in the effective subcarrier frequency band. As a pattern of PAPR reduction signals inserted in the idle band in the case of 16 QAM modulation, as described above, a pattern is selected whose PAPR measurement result by the PAPR measure 23 obtained in the case where a pattern to be inserted is changed is lowest.

The subcarrier-mapped signal (symbols) is subjected to an IFFT processing in the IFFT 15, whereby the signal is converted to a time-domain signal. Then, CPs are added to the time-domain signal by the CP inserter 16 and the CP-added signal is finally radio-transmitted toward the BTS 4, for example.

As described above, according to the present embodiment, without using the waveform shaping filter 13, the same functions and effects as those obtained by the first embodiment can be obtained, i.e., with an increase in PAPR being suppressed, it is possible to achieve effective utilization of a transmission frequency band, an increase in the number of pilots, the channel estimation accuracy of a receiving end by a distributed arrangement, and an improvement in demodulation characteristics. Thus, as described with reference to FIG. 3, in the case where the aforementioned configuration of the transmitter is applied to a transmission system of an MS 1, too, without increasing the circuit size of the MS 1 and with an increase in PAPR being suppressed, it is possible to achieve effective utilization of a provided transmission frequency band, an increase in the number of inserted pilots in the transmission frequency band, the channel estimation accuracy of the BTS 4 by a distributed arrangement, and an improvement in demodulation characteristics. Note that the configuration of the BTS 4 may be the same as or similar to that shown in FIG. 4.

(C) Description of Variants of the First and Second Embodiments

Although, in the first embodiment, at the time of QPSK modulation with which the PAPR of a data signal tends to decrease as compared with the case of 16 QAM modulation with which the PAPR of a data signal tends to increase, pilots are mapped onto all subcarriers in an idle band, mapping can also be performed using pilots and the PAPR reduction signals in combination. By thus mapping the PAPR reduction signals and the pilots in combination, an increase in PAPR caused by inserted pilots can be suppressed.

A configuration that realizes this approach may be one in which, for example, in place of the pilot generator 17 in FIGS. 1 and 3, the PAPR reduction pattern/pilot generator 22 shown in FIG. 5 is applied and the insertion ratio of PAPR reduction signals to pilot signals is controlled (specified) by the controller 18.

Although, in the second embodiment, at the time of 16 QAM modulation, PAPR reduction signals are mapped onto all subcarriers in an idle band, and at the time of QPSK modulation, pilots are mapped onto all the subcarriers in the idle band, in either case, mapping can be performed using pilots and PAPR reduction signals in combination.

Figure 7A:
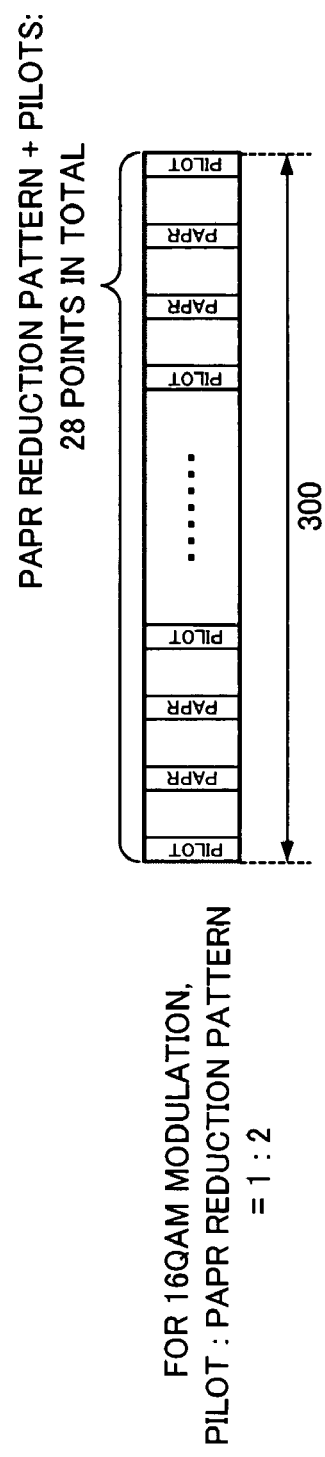
FIG. 7A is a diagram showing an operation in which in the case where 16 QAM modulation is performed, the PAPR reduction signals larger in number than the pilot signals are inserted in the idle band.
Figure 7B:
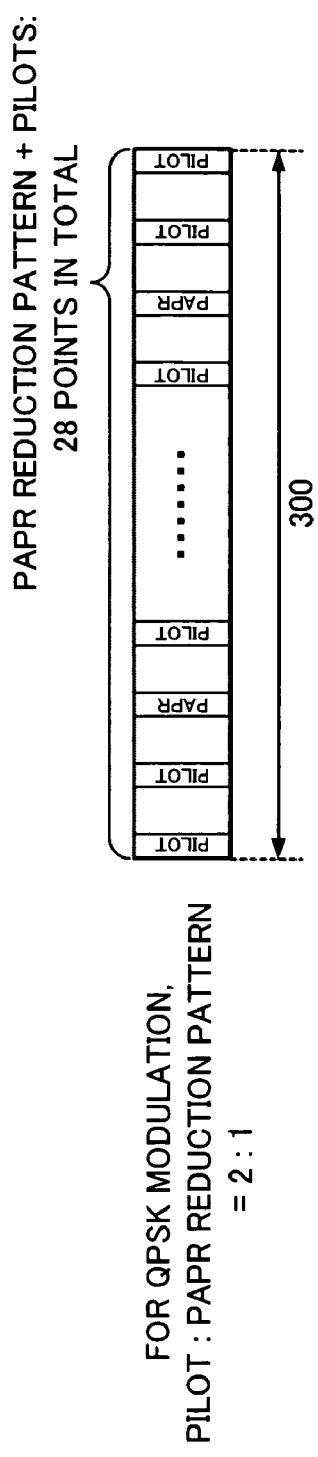
FIG. 7B is a diagram showing an operation in which in the case where QPSK modulation is performed, the pilot signals larger in number than the PAPR reduction signals are inserted in the idle band.
Figure 8:
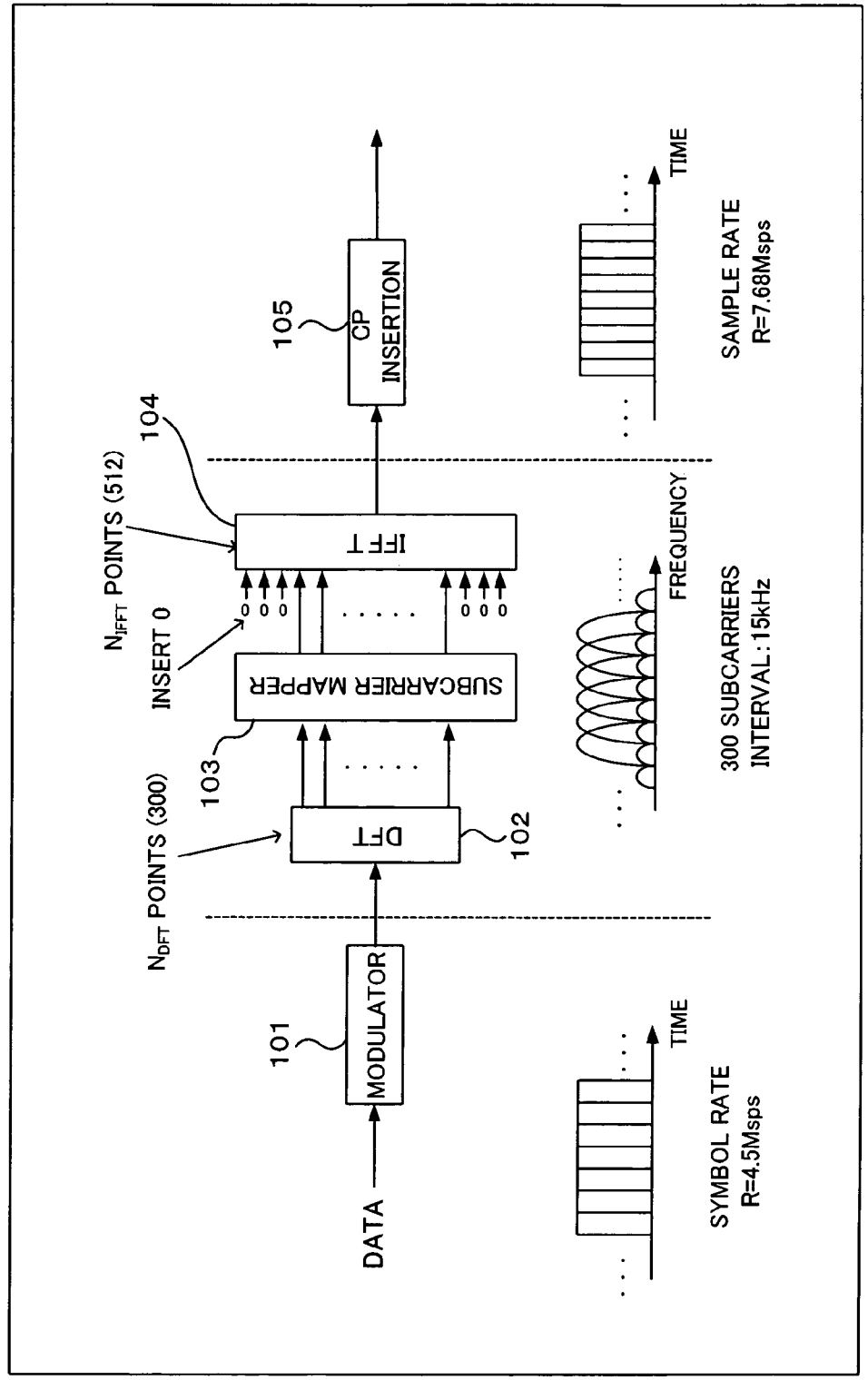
FIG. 8 is a block diagram showing a configuration that focuses attention on an essential part of a transmitter that adopts DFT-S-OFDM.

Specifically, at the time of 16 QAM modulation, as shown in FIG. 7A, for example, pilots and PAPR reduction signals in combination are mapped at a predetermined ratio (the PAPR tends to increase and thus the ratio is set such that the number of PAPR reduction signals is larger than that of pilots (e.g., the number of pilots: the number of PAPR reduction signals=1:2)). On the other hand, at the time of QPSK modulation, the PAPR tends to decrease as compared with the case of 16 QAM modulation and thus, as shown in FIG. 7B, for example, pilots and PAPR reduction signals in combination are mapped at a ratio set such that the number of pilots is larger than that of PAPR reduction signals (e.g., the number of pilots: the number of PAPR reduction signals=2:1).

Such combination mapping can be realized by, for example, allowing the controller 24 shown in FIG. 5 to control the ratio of PAPR reduction signals to pilots to be output to the subcarrier mapper 14 from the PAPR reduction pattern/pilot generator 24, according to modulation scheme information (16 QAM/QPSK).

Note that also in the case where such combination mapping is performed, it is preferable that pilots and PAPR reduction signals be distributed and arranged such that the pilots or the PAPR reduction signals are not concentrated on one part in a transmission frequency band (effective subcarrier frequency band).

(D) Others

Although embodiments of the present invention are described in detail above, it is to be understood that the present invention is not limited to the embodiments and various modifications can be made thereto without departing from the scope and spirit of the present invention.

For example, although, in the first and second embodiments, when pilots or PAPR reduction signals in an idle band are inserted, the roll-off rate $\alpha$ is 0, the roll-off rate $\alpha$ is not always necessary to be 0.

In the first embodiment, in the case where pilots are inserted at the time of QPSK modulation, band limitation with a lower roll-off rate than a roll-off rate $\alpha$ that is used at the time of 16 QAM modulation can also be applied. Furthermore, in the second embodiment too, band limitation may be performed with the roll-off rate $\alpha$ being>0.

In the foregoing embodiments, focusing attention on the fact that the value of the PAPR of a modulated data signal depends on a modulation scheme, the case of applying 16 QAM as the modulation scheme is used as an example for the case in which the PAPR tends to increase, and the case of applying QPSK as the modulation scheme is used as an example for the case in which the PAPR tends to decrease, and by the difference between these modulation schemes, whether performing a waveform shaping processing is proper (setting of the roll-off rate a), insertion of PAPR reduction signals/pilots in an idle band, the ratio of the PAPR reduction signals to the pilots, etc., are controlled; it is also possible to similarly perform equivalent control by transmission conditions or parameters that affect PAPR characteristics in the same manner as the above.

As described above in detail, according to the present invention, with the number of conversions from a time-domain data signal to a frequency-domain data signal being fixed, signals other than the data signal can be allocated to subcarriers in an idle band of a transmission frequency band; thus, without the need to prepare a plurality of time/frequency-domain conversion circuits with a large size and without increasing the circuit size, frequency utilization efficiency can be improved. Accordingly, the present invention is considered to be extremely useful in the field of radio communication techniques, particularly, the field of mobile communication techniques.

What is claimed is:

1. A transmitter comprising:
    a time/frequency-domain conversion unit which converts a time-domain data signal to a frequency-domain data signal of a predetermined number;
    a subcarrier allocation unit which allocates means for allocating the frequency-domain data signal obtained by the time/frequency-domain conversion unit to any of subcarriers, a number of which exceeds the predetermined fixed-number, the subcarriers being allocated in a predetermined transmission frequency band;
    a generation unit which generates pilot signals or PAPR (Peak to Average Power Ratio) reduction signals for reducing a PAPR of the data signal; and
    a control unit which controls means for controlling the subcarrier allocation unit to allocate the pilot signals or the PAPR reduction signals as signals other than the data signal to subcarriers in a band to which the data signal is not allocated by the subcarrier allocation unit.

2. The transmitter according to claim 1, wherein the control unit controls the allocation to the subcarriers in the band which is performed by the subcarrier allocation unit, such that the signals other than the data signal are uniformly arranged in the transmission frequency band.

3. The transmitter according to claim 1, wherein the control unit controls the subcarrier allocation unit to allocate the PAPR reduction signals to the subcarriers in the idle-band upon the PAPR of the data signal tending to increase.

4. The transmitter according to claim 3, wherein the PAPR of the data signal tends to increase upon the data signal being 16 QAM-modulated.

5. The transmitter according to claim 1, wherein the control unit controls the subcarrier allocation unit to allocate the pilot signals to the subcarriers in the idle-band upon the PAPR of the data signal tending to decrease.

6. The transmitter according to claim 5, wherein the PAPR of the data signal tends to decrease upon the data signal being QPSK-modulated.

7. The transmitter according to claim 1, further comprising:
    PAPR reduction signal generation unit which generates, as the signals other than the data signal, PAPR reduction signals for reducing a PAPR of the data signal; and
    pilot generation unit which generates pilot signals as the signals other than the data signal, wherein
    the control unit controls the subcarrier allocation unit to allocate the PAPR reduction signals to the subcarriers in the band upon the PAPR of the data signal tending to increase, and controls the subcarrier allocation unit to allocate the pilot signals to the subcarriers in the band upon the PAPR of the data signal tending to decrease.

8. The transmitter according to claim 7, wherein the PAPR of the data signal tends to increase upon the data signal being 16 QAM-modulated.

9. The transmitter according to claim 7, wherein the PAPR of the data signal tends to decrease upon the data signal being QPSK-modulated.

10. The transmitter according to claim 1, further comprising a waveform shaping unit which performs a waveform shaping processing for reducing a PAPR of the data signal, wherein
    the control unit controls the waveform shaping unit to perform the waveform shaping processing on the data signal upon the PAPR of the data signal tending to increase.

11. The transmitter according to claim 10, wherein the PAPR of the data signal tends to decrease upon the data signal being QPSK-modulated.

12. The transmitter according to claim 1, further comprising:
    PAPR reduction signal generation unit which generates, as the signals other than the data signal, PAPR reduction signals for reducing a PAPR of the data signal; and
    pilot generation unit which generates pilot signals as the signals other than the data signal, wherein
    the control unit controls the subcarrier allocation unit-mea-RS to allocate, upon the PAPR of the data signal tending to increase, the PAPR reduction signals and the pilot signals to the subcarriers in the band such that a number of the PAPR reduction signals is larger than a number of the pilot signals, and controls the subcarrier allocation unit to allocate, upon the PAPR of the data signal tending to decrease, the PAPR reduction signals and the pilot signals to the subcarriers in the band such that the number of the pilot signals is larger than the number of the PAPR reduction signals.

13. The transmitter according to claim 12, wherein the PAPR of the data signal tends to increase upon the data signal being 16 QAM-modulated.

14. The transmitter according to claim 1, wherein the time/frequency-domain conversion unit is composed of a DFT (Discrete Fourier Transformer).

15. The transmitter according to claim 1, wherein the predetermined number is a power of two and the time/frequency-domain conversion unit is composed of an FFT (Fast Fourier Transformer).

16. A transmission method comprising:
    converting a time-domain data signal to a frequency-domain data signal of a predetermined number;
    a subcarrier allocation step of allocating the frequency-domain data signal obtained in the time/frequency-domain conversion to any of subcarriers, a number of which exceeds the predetermined number, the subcarriers being allocated in a predetermined transmission frequency band;
    generating pilot signals or PAPR (Peak to Average Power Ratio) reduction signals for reducing a PAPR of the data signal; and
    controlling, by a control unit, the subcarrier allocation to allocate the pilot signals or the PAPR reduction signals as signals other than the data signal to subcarriers in a band to which the data signal is not allocated.

* * * * *